United States Patent [19]
Anderegg

[11] 3,781,801
[45] Dec. 25, 1973

[54] PROCESS FOR OPTICAL RECOGNITION OF CHARACTERS

[75] Inventor: Max Anderegg, Egg, Switzerland

[73] Assignee: Turlabor AG., Zumikon, Switzerland

[22] Filed: Nov. 10, 1971

[21] Appl. No.: 197,333

[30] Foreign Application Priority Data
Nov. 13, 1970 Switzerland ........ 16832/70

[52] U.S. Cl. ........ 340/146.3 MA
[51] Int. Cl. ........ G06k 9/12
[58] Field of Search ........ 340/146.3 F, 146.3 MA, 340/146.3 Q, 146.3 D

[56] References Cited

UNITED STATES PATENTS

| | | | |
|---|---|---|---|
| 3,258,581 | 6/1966 | Buell | 340/146.3 MA |
| 3,177,470 | 4/1965 | Galopin | 340/146.3 MA |
| 3,588,818 | 6/1971 | Congleton et al. | 340/146.3 MA |
| 3,624,606 | 11/1971 | Lefevre | 340/146.3 MA |

FOREIGN PATENTS OR APPLICATIONS

| | | | |
|---|---|---|---|
| 1,222,657 | 2/1971 | Great Britain | 340/146.3 D |

*Primary Examiner*—Daryl W. Cook
*Assistant Examiner*—Joseph M. Thesz, Jr.
*Attorney*—Eric H. Waters et al.

[57] ABSTRACT

A character is optically scanned by being moved in a direction perpendicular to an alignment of photosensitive elements such as photodiodes. The photodiodes, to which sampling pulses are applied produce successive scanning pulses so that the character can be considered as divided into a matrix grid. The information within the matrix grid is grouped into several displaced grids, each displaced grid representing information produced at corresponding offset locations in a cell of the original grid. The information of each of the displaced grids is separately compared bit by bit with reference characters to ascertain conformity to the greatest degree to establish identity of the character which has been scanned.

1 Claim, 22 Drawing Figures

PROCESS FOR OPTICAL RECOGNITION OF CHARACTERS

BACKGROUND OF THE INVENTION a. 1. Field of the Invention

The present invention relates to a process for optical recognition of characters in which, in order to determine the character, the same is scanned in a grid and the resulting matrix information is compared with the matrix information of reference characters.

2. Prior Art

There are available standardized characters suitable for optical recognition of such characters, which can be easily recognized either visually or mechanically. Such standardized font is font A for the mechanical optical recognition of characters according to ISO (International Organization for Standardization) recommendation No. 996. In many cases, the supply of characters can be limited, as, for instance, if the supply is limited to the decimal numbers and, if necessary, to several special characters. This reduced set of characters as disclosed, for instance, in ISO recommendation No. 996, comprises only those elements which can be fitted in a grid of 5 × 9 grid cells or grid elements.

In most cases, the character is scanned in a grid by an optical electrical device. The problem to be solved is the determination of the minimal resolution of the scanning process with simultaneous consideration of maximum reliability of recognition.

In order to illustrate the existing problems, it is assumed that the scanning is effected by a linear arrangement of photodiodes and that the character to be recognized is moved in a direction perpendicular to this arrangement of photodiodes. The time difference of two sampling pulses applied to photodiodes determines the resolution in the horizontal direction, whereas the resolution in the vertical direction is given by the number of photodiodes. By way of example, if a column of nine photodiodes undergoes five sampling pulses in the time interval when a character passes the column of photodiodes, the character is effectively divided into a grid of five horizontal cells and nine vertical cells i.e. a 5 × 9 grid with one photodiode pulse per grid cell.

In order to achieve maximum reliability, various requirements must be met by the characters, which requirements are described in greater detail either in the aforementioned ISO recommendation or in other standards. The variation of the stroke width of the characters is particularly important for the determination of the resolution capability. For instance, for a type size A1 with a height of character of 2.7 mm, the variation is:

for tolerance range X : 0.35 ± 0.08 mm for tolerance range Y : 0.35 ± 0.15 mm

The smaller of the tolerances can be achieved only in a very good printing process. On the contrary, most of the conventional printing processes can comply with the requirements of the larger tolerance. The following explanation relates to the conditions for tolerance range Y as taken with reference to FIGS. 1 and 2.

In FIG. 1, there are shown the conditions used in the conventional character recognition process, and in a disadvantageous situation. A 5 × 9 grid has, for type size A1 with a height of character of 2.7 mm, a cell width A of 0.3 mm. The smallest possible resolution is one photodiode per grid cell. Two photodiodes P from a number of photodiodes arranged in a column are shown in FIG. 1. The operating thresholds of the photodiodes must be selected in such a manner that the recognition of the stroke is ensured even in the least favorable case.

The minimum stroke width D of a character Z, which is moved in the direction of the arrow (perpendicular to the row of photodiodes P), is 0.2mm for tolerance range Y. Only one photodiode P responds for a stroke of minimum width of 0.2 mm, whereas two photodiodes always respond for a stroke of maximum stroke width of 0.5 mm. In the illustrated comparatively small resolution, in addition to the above, the relative vertical position of the stroke of the character has an important effect. It can be shown that, if the stroke width is 0.35 mm, only one photodiode responds in approximately half of the cases, while, in the other cases, two photodiodes respond, dependent on the vertical position of the stroke in relation to the photodiodes. It is evident that this can have a very disadvantageous effect on the reliability of recognition in an arrangement with a comparatively small resolution.

In order to avoid this drawback, it might be assumed that the resolution could be doubled by the provision of two photodiodes for each cell of the original 5×9 grid and doubling the sampling rate so that the scanned characters can be represented in a 10×18 grid. In this case, stroke width will vary from one to three grid cells; the stroke will be correspondingly indicated as being one to three bits wide. In order to be able to also depict a character with a larger stroke width, an 11 × 19 grid is used to advantage for scanning instead of a 10 × 18 grid.

In a simple classification process, several difficulties arise as a result of the differing stroke width. This is illustrated with reference to a so-called matrix comparison method, in which a scanned character is compared one bit after another with an ideal character of each character class. The scanned character is then classified in that class, with which it has most in common. Table I shows an example of comparison of characters, wherein the given characters are compared with reference characters of the classes "2" and "6," both given and reference characters being coded on a 11×19 grid. Herein, the given characters Nos. 1 and 4 have, in an 11 × 19 grid a minimum stroke width of 1 grid cell, the characters Nos. 2 and 5 have a stroke width of two grid cells, i.e. the ideal stroke width, and the characters 3 and 6 have a large stroke width of three grid cells. The characters Nos. 1 to 3 belong to the class "2" and the characters Nos. 4 to 6 belong to the class "6."

From the results of Table I, it can be seen that the variation of the stroke width has a detrimental influence on the classification. Particularly, the difference to the remaining classes has a considerable effect on the reliability of recognition.

TABLE I

| Character No. | Agreement with Class 2 | Agreement with Class 6 | Difference |
|---|---|---|---|
| 1 | 79% | 61% | 18% |
| 2 | 100% | 63% | 37% |
| 3 | 78% | 52% | 26% |
| 4 | 61% | 80% | 19% |
| 5 | 63% | 100% | 37% |
| 6 | 47% | 82% | 35% |

SUMMARY OF THE INVENTION

It is an object of the present invention to avoid the above mentioned drawbacks and to significantly eliminate the influences of different line thicknesses of the character element with respect to the scanning element.

According to the invention, the process is characterized in that each grid cell of the character to be recognized is scanned at a number of positions which are offset relative to each other in the directions of both coordinate axes and the scanning information corresponding to the interrelated positions of the grid cells are evaluated separately from the scanning information of the other interrelated positions in such a manner that a number of sub-grids are obtained which corresponds to the number of the positions for each grid cell, each of which sub-grids is shifted in relation to the others. Each of the sub-grids is compared bit by bit with the reference characters in order to determine the highest degree of similarity.

An example of the embodiment of the process is explained in greater detail hereafter with reference to the accompanying drawing.

DETAILED DESCRIPTION

Figure 1:
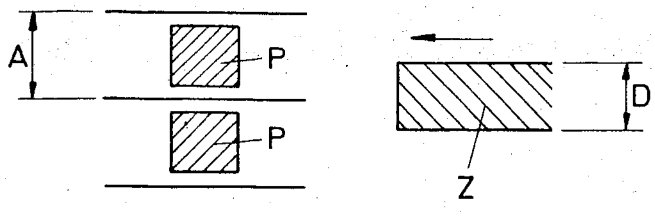
FIG. 1 is a partial schematic illustration of conventional scanning of a character with one photodiode per grid cell.
Figure 2:
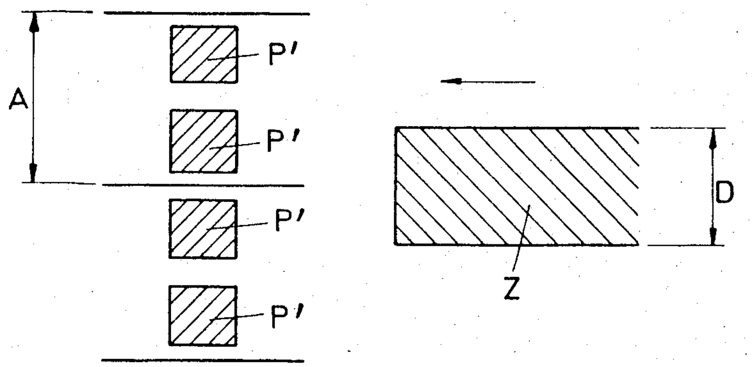
FIG. 2 is a partial schematic illustration of scanning of a character with two diodes per grid cell.

In the embodiment which will be explained in the following, the basic device is a scanning apparatus with photodiodes arranged in a line which is perpendicular to the direction of travel of the character to be recognized during the scanning operation. Two photodiodes P' are provided for each grid cell as shown in cross-sectional schematic view in FIG. 2, wherein the width A of the cell is again 0.3 mm and the character Z to be recognized has a nominal stroke width D of 0.35 mm, whose tolerances in the range Y have the values of ± 0.15 mm.

Next, it is assumed that the photodiodes are consecutively numbered. If the scanning information of the photodiodes with even numbers is evaluated separately from that of the photodiodes with odd numbers, the result of the evaluation corresponds to two displaced grids with one photodiode per sub-grid, the displaced grids being shifted by one-half the width of a grid cell in relation to each other.

In an analogous manner, arrangements are made for scanning in the horizontal direction, i.e. in the direction of movement of the character Z. Instead of applying one sampling pulse per grid cell as in the conventional devices, the number of sampling pulses is doubled. Hereby, the information i.e. scanning pulses, obtained in this manner is also separated and evaluated after each first and second sampling pulses per grid cell, so that two additional displaced grids are obtained which are shifted by one-half the width of a grid cell in relation to each other.

The combination of both aforementioned scanning processes, which are doubled both in the vertical and the horizontal directions, delivers accordingly four groups of scanning information, which produce four interposed grids which are evaluated separately, in that each of the four displaced grids is compared with the grid of one or more reference characters. For instance, four mutually interposed 5 × 9 grids each are obtained in this manner from a grid field of 11 × 19 cells (or 10 × 18), corresponding to a character to be recognized.

Figure 3:
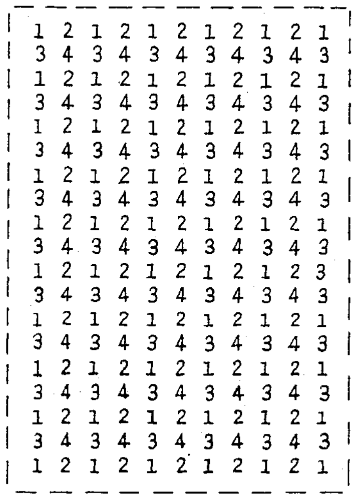
FIG. 3 is a scanning grid with reference numerals, in an embodiment of the process according to the invention.
Figure 4A:
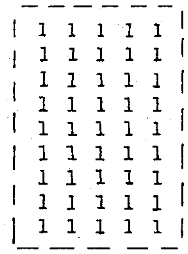
FIGS. 4A to 4D are displaced grids resulting from the separate evaluation of the grid according to FIG. 3 in accordance with the reference numerals.
Figure 4B:
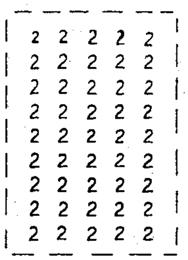
Figure 4C:
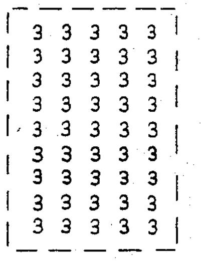
Figure 4D:
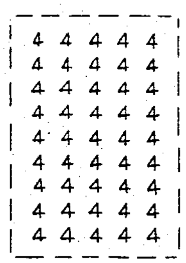

In FIG. 3, there is schematically shown a mosaic-like scanning for an 11 × 19 cells, which results from doubling the resolution during the scanning of a character 5 × 9 grid. It can be considered that for a 5 × 9 grid there are two photodiodes arranged vertically in each cell width and each photodiode is provided with two sampling pulses for each cell length. Thus, scanning pulses 1, 3 and 2, 4 respectively are produced in the vertical direction and 1, 2 and 3, 4 in the horizontal direction in each cell. Each group of numerals 1, 2, 3, 4 thus represents the scanning pulses generated per grid cell of the original 5 × 9 grid, and constitutes the corresponding scanning information. There is added in every case one border row 1, 2 and one border column 1, 3, in order to be able to also scan characters with larger stroke width.

Now, if the scanning information provided with the same numeral, i.e. the scanning information with the same position inside each grid cell of the 5 × 9 grid is separated from all other information, displaced 5 × 9 grids are obtained as shown in FIGS. 4A to 4D, which can now be compared bit by bit with a reference character with a nominal stroke width of the same class of characters, and with reference characters of other character classes.

The above mentioned process is explained in greater detail for the character "2" with reference to FIGS. 5 to 5D, 6 to 6D and 7 to 7D.

Figure 5:
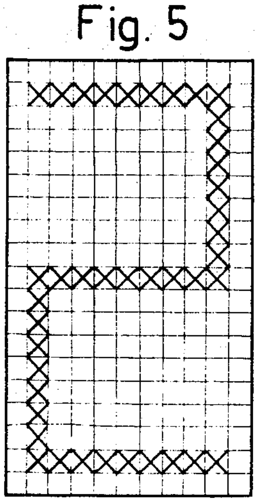
FIGS. 5, 6 and 7 are disposed grids of the character "2" with small, ideal and large line thickness.
Figure 6:
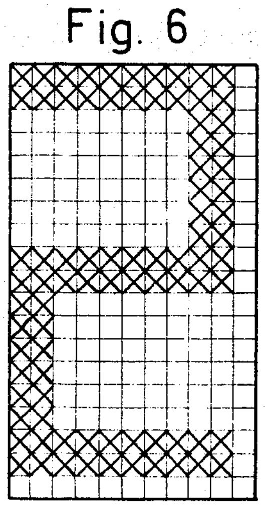
Figure 7:
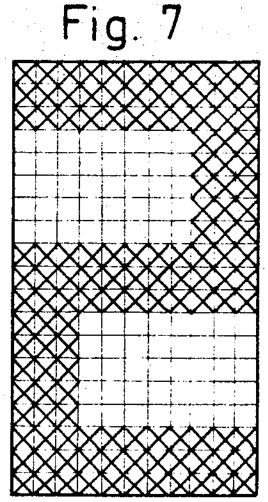
Figure 5A:
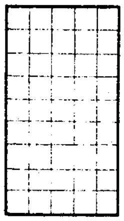
FIG. 5A to 5D, 6A to 6D and 7A to 7D are corresponding displaced grids which result from the separate evaluation of the grids according to FIGS. 5, 6 and 7 according to the reference numerals.
Figure 5B:
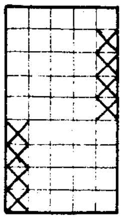
Figure 6B:
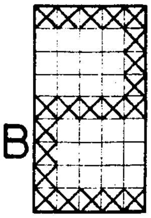
Figure 7B:
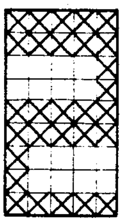
Figure 5C:
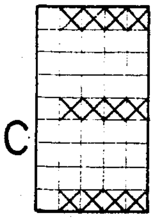
Figure 6C:
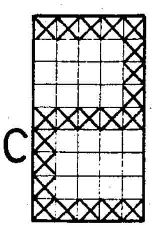
Figure 7C:
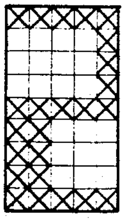
Figure 5D:
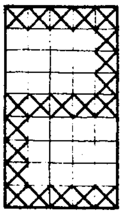
Figure 6D:
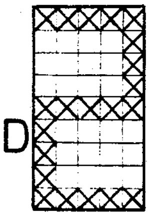
Figure 7D:
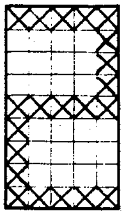

FIG. 5 represents the 11 × 19 grid for the character "2" with a minimum stroke width of 0.2 mm in the aforementioned range Y, FIG. 6 shows the same character with the nominal stroke width of 0.35 mm, and FIG. 7 the same character with the maximum line thickness of 0.5 mm. The scanning is conducted in accordance with the schematic illustration shown in FIG. 3, wherein the scanning information provided with the same numeral according to FIG. 3 is evaluated separately from the other information. The correspondingly obtained 5 × 9grids are shown in the figures with suffix A. Accordingly, the grid of FIG. 5A receives that information from the grid of FIG. 5, which is designated by the numeral 1 in FIG. 3, the grid of FIG. 5B receives the information designated by numeral 2, the grid of FIG. 5C receives the information designated by numeral 3, and finally, the grid of FIG. 5D receives the information designated by numberal 4 in FIG. 3.

Figure 6A:
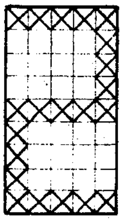
Figure 7A:
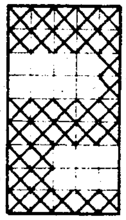

The accordingly obtained 5 × 9 scanning grids as shown in FIGS. 5A to 5D, 6A to 6D and 7A to 7D are subsequently compared with the reference characters of the same class and of other classes in order to ascertain which character the character to be recognized has the best conformity, and to classify the characters accordingly. Hereby, the reference character of the class "2" corresponds to the character as shown in FIG. 6A. It can be evidently seen from the illustrations that, despite the varying stroke width of the character to be recognized, it is possible to obtain at least one scanning image which optimally conforms with the reference character, in the present example to 100 percent.

The remaining scanning images have to be subsequently checked, to see if they conform more with another class. There is shown such a complete comparison in reference to the characters "2" and "6" in Table II, wherein the characters Nos. 1, 2 and 3 are the characters of FIG. 5, 6 and 7, while the characters Nos. 4, 5 and 6 are the character "6" having the corresponding stroke width.

If the results of Table II are compared with those of Table I for conventional processes, a substantial increase in the reliability of recognition can be immediately established for the present process by reason of the substantial increase in the "difference."

TABLE II

| Character No. | Agreement with Class 2 | Class 6 | Difference |
|---|---|---|---|
| 1 | 100% | 57% | 43% |
| 2 | 100% | 57% | 43% |
| 3 | 100% | 62% | 38% |
| 4 | 55% | 98% | 43% |
| 5 | 57% | 100% | 43% |
| 6 | 57% | 100% | 43% |

Consequently, the present process has the significant advantages that the storage requirement for the reference characters is reduced from a 10 × 18 grid grid in the conventional processes to the grid size of 5 × 9 cells and that always one of the accordingly obtained scanning grids is particularly advantageous in relation to the reference character, so that the influence of the stroke width is substantially eliminated.

It is evident that the present process is not limited to the disclosed scanning device, but can be used in all grid-like scanning devices. Moreover the process can be applied not only to the above mentioned reduced set consisting of decimal numerals and several special characters, but also to a broader character set including capital letters. In spite of the fact that the capital letters, for instance the letter A, are composed to a large extent and in considerable lengths of inclined lines, a better reliability of recognition is achieved by the present process.

What is claimed is:

1. A process for the optical recognition of characters, in which the character is scanned in the manner of a grid formed of cells arranged along mutually perpendicular coordinate axes, the scanning information thus obtained being compared with references characters, said process comprising scanning the character which is to be recognized within each grid cell, the scanning being effected by photoelectrically sensitive elements which are arranged in a column and by moving the character to be recognized perpendicularly to said column, two of the photoelectrically sensitive elements being arranged in said column for each grid cell, supplying two successive sampling pulses to each photoelectrically sensitive element during the time corresponding to the relative change of position of the character by the distance of one grid cell such that four scanning portions are obtained for each grid cell, evaluating the scanning information corresponding to identical positions in all grid cells separately from the scanning information of the other positions, and comparing each evaluated scanning information of said identical positions bit by bit with the reference characters to determine the reference character having the greatest degree of conformity with one of said evaluated scanning information of identical positions.

* * * * *